Figure 3:
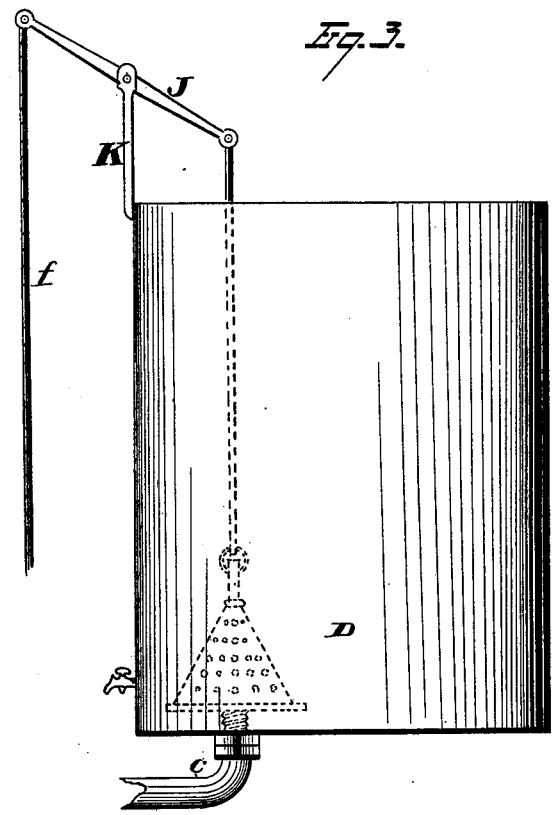

2 Sheets—Sheet 1.
J. P. DUNCAN.
TANK-VALVE.
No. 191,523. Patented June 5, 1877.
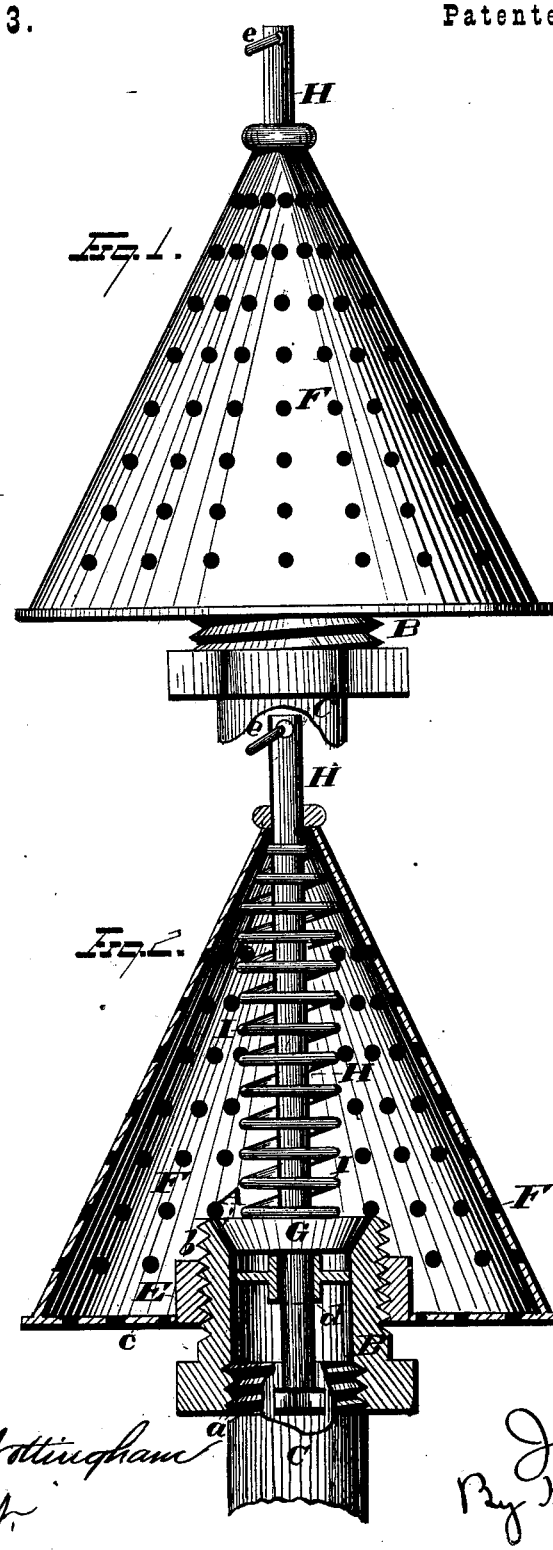
WITNESSES
Ed. J. Nottingham
A. W. Bright
INVENTOR
John P. Duncan
By H. A. Seymour
ATTORNEY

J. P. DUNCAN.
TANK-VALVE.

No. 191,523.                    Patented June 5, 1877.

WITNESSES
Ed. J. Nottingham
A. W. Bright

INVENTOR
John P. Duncan,
By H. A. Seymour,
ATTORNEY

UNITED STATES PATENT OFFICE.

JOHN P. DUNCAN, OF HELENA, ARKANSAS, ASSIGNOR OF ONE-HALF HIS RIGHT TO DAVID H. CREBS, OF SAME PLACE.

IMPROVEMENT IN TANK-VALVES.

Specification forming part of Letters Patent No. 191,523, dated June 5, 1877; application filed April 10, 1877.

*To all whom it may concern:*

Be it known that I, JOHN P. DUNCAN, of Helena, in the county of Phillips and State of Arkansas, have invented certain new and useful Improvements in Valves; and I do hereby declare the following to be a full, clear, and exact description of the invention, such as will enable others skilled in the art to which it pertains to make and use it, reference being had to the accompanying drawings, which form part of this specification.

My invention relates to an improvement in valves for tanks, the object of the same being to provide a valve of such a construction that all sediment shall be excluded from the valve, and the parts so arranged that access may be readily had to the interior of the valve-casing when desired; and to that end my invention consists, first, in the combination, with a valve-seat, of a removable collar, provided with a strainer which covers the valve and seat, and thereby excludes all sediment from contact with the valve or its seat; second, in the combination, with the valve-seat and a removable collar provided with a strainer, of a valve having a stem extending through the same, the upper end of the stem serving as a guide for the valve, and a spring which serves to seat the valve, while the lower stem serves as a guide to accurately seat the valve.

In the accompanying drawings, Figure 1 is a side elevation of the valve. Fig. 2 represents a vertical section of the valve, and Fig. 3 represents a tank provided with my improved valve.

A represents the valve-seat, preferably made of brass, although it may be made of any desired material. The lower and inner surface of the tube B is screw-threaded at $a$ to allow the attachment of a pipe, C, to conduct water away from the tank D. The upper end of tube B has screw-threads $b$ cut thereon, which fit corresponding threads formed on the inner surface of a collar, E. Strainer F, of conical or any other desired shape, has its lower and imperforate position $c$ rigidly secured by soldering or otherwise to the collar E, and as the latter is secured in place on the tube B the strainer serves to exclude all sediment from coming in contact with valve-seat A. G represents a conical valve, having an upper stem, H, which extends upwardly through the top of strainer F, and a lower stem which passes through a guide, $d$, attached to the tube B, thereby serving to guide the valve to its seat.

A spiral spring, I, is placed around the upper stem H, the upper end of the spring resting against the strainer, while the lower end of the spring is seated on the upper surface of the conical valve. The spring serves to keep the valve in a closed position. The upper end of valve-stem H is provided with a ring, $e$, to which is attached one end of a wire or cord, the other end being secured to the end of a lever, J, fulcrumed on a standard, K, secured to the top of the tank.

A pull-cord, $f$, is secured to the opposite end of lever J, thus allowing the valve within the tank to be operated by pulling the cord $f$. The valve is limited in its movement by a nut, $g$, attached to the lower stem below the guide $d$.

The finer sediment, which naturally collects in the bottom of the tank, is excluded from contact with the valve and valve-seat, owing to the location of the valve in the tank. The tube B is inserted in the tank, and then the collar E is screwed thereon, and serves to retain the tube within the tank, and also raises the valve-seat above the floor of the tank.

The location of the valve-seat may be varied by means of the collar E, as the latter, when turned down, serves to raise the valve to any desired height.

I do not limit myself to the exact construction of valve shown and described, as it is evident that a flat, instead of a conical, valve may be used without departing from the spirit of my invention. Again, the valve may be provided with depending wings to serve as guides, and thus dispense with guide $d$ and the lower stem of the valve.

When it is desired to gain access to the interior of the valve-chamber the nut $g$ secured to the valve-stem is removed, when the tube B may be readily detached from the collar by which it is secured in place.

A tank-valve, constructed in accordance with my invention, is simple in construction, of few parts, and serves to exclude all sediment from the valve and the pipe through which water is conducted from the tank.

Having fully described my invention, what I claim as new, and desire to secure by Letters Patent, is—

1. In a valve for tanks, the combination, with the valve-seat, of a removable collar, having a strainer rigidly secured thereto, substantially as and for the purpose set forth.

2. In a valve for tanks, the combination, with the valve-seat and removable collar having a strainer rigidly secured thereto, of a valve and a spring, the latter having its upper end resting against the strainer, and the lower end seated on the upper surface of the valve, substantially as and for the purpose set forth.

3. In a valve for tanks, the combination, with a valve-seat and a strainer, located above and around the same, of a valve, the upper stem of which extends upwardly through the strainer, and is provided with a ring for the attachment of a cord for operating the valve.

In testimony that I claim the foregoing I have hereunto set my hand this 29th day of March, 1877.

JOHN P. DUNCAN.

Witnesses:
  E. M. BENNETT,
  JAMES M. HANKS.